United States Patent
Liu et al.

(10) Patent No.: US 12,248,473 B1
(45) Date of Patent: Mar. 11, 2025

(54) QUERY PERFORMANCE PREDICTION USING MULTIPLE EXPERTS

(71) Applicant: Amazon Technologies, Inc., Seattle, WA (US)

(72) Inventors: Zhengchun Liu, Sunnyvale, CA (US); Gaurav Saxena, Cupertino, CA (US); Balakrishnan Narayanaswamy, San Jose, CA (US); Kaihui Zheng, Mountain View, CA (US); Mohammad Rezaur Rahman, Fremont, CA (US); Tim Kraska, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/540,496

(22) Filed: Dec. 14, 2023

(51) Int. Cl.
 *G06F 16/2453* (2019.01)
(52) U.S. Cl.
 CPC .............................. *G06F 16/24545* (2019.01)
(58) Field of Classification Search
 CPC ................................................ G06F 16/24545
 See application file for complete search history.

(56) References Cited

U.S. PATENT DOCUMENTS

| | | | |
|---|---|---|---|
| 8,275,762 B2 * | 9/2012 | Gupta | G06F 16/217 707/718 |
| 9,189,523 B2 | 11/2015 | Ganapathi et al. | |
| 10,891,290 B2 * | 1/2021 | Morris | G06F 16/24542 |
| 10,922,316 B2 * | 2/2021 | Saxena | G06F 16/283 |
| 11,256,698 B2 * | 2/2022 | Idicula | G06N 5/01 |
| 11,308,100 B2 * | 4/2022 | Saxena | G06F 16/285 |
| 11,537,616 B1 * | 12/2022 | Lin | G06N 20/00 |
| 11,727,004 B2 * | 8/2023 | Li | G06N 5/04 707/720 |
| 11,868,359 B2 * | 1/2024 | Saxena | G06F 16/2458 |
| 2008/0195577 A1 * | 8/2008 | Fan | G06F 16/24545 |
| 2010/0082602 A1 * | 4/2010 | Ganapathi | G06F 16/24545 707/718 |
| 2013/0226903 A1 * | 8/2013 | Wu | G06F 16/24549 707/719 |
| 2016/0188696 A1 * | 6/2016 | Belghiti | G06F 16/2272 707/718 |
| 2016/0203404 A1 * | 7/2016 | Cherkasova | G06N 5/04 706/12 |
| 2017/0213257 A1 * | 7/2017 | Murugesan | G06Q 30/0275 |

(Continued)

*Primary Examiner* — Jorge A Casanova
(74) *Attorney, Agent, or Firm* — S. Scott Foster; Kowert, Hood, Munyon, Rankin & Goetzel, P.C.

(57) ABSTRACT

A future workload may be predicted for a database system using analysis of queries submitted for execution. A feature vector for a query may be determined according to a query plan for the query. If the feature vector has not been previously seen, or has not been sufficiently seen, by the database system, a machine learning inference may be used to predict performance characteristics of the query, the machine learning system trained using previous feature vectors and performance characteristics of executed queries. If the feature vector has been sufficiently seen previously by the database system, a history of performance characteristics of previous queries with similar or the same feature vector may be used to predict the performance characteristics. The predictions may then be used to configure or reconfigure processing cluster(s) of the database system.

20 Claims, 9 Drawing Sheets

(56) References Cited

U.S. PATENT DOCUMENTS

2018/0060395 A1* 3/2018 Pathak ................. G06F 16/248
2020/0285642 A1* 9/2020 Bei ......................... G06N 5/01
2021/0286784 A1* 9/2021 Chen ..................... G06N 20/00

* cited by examiner

QUERY PERFORMANCE PREDICTION USING MULTIPLE EXPERTS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. However, many workloads are unknown when data processing resources are configured or change over time. Challenges in obtaining the right configuration of data processing resources occur frequently.

Figure 1:
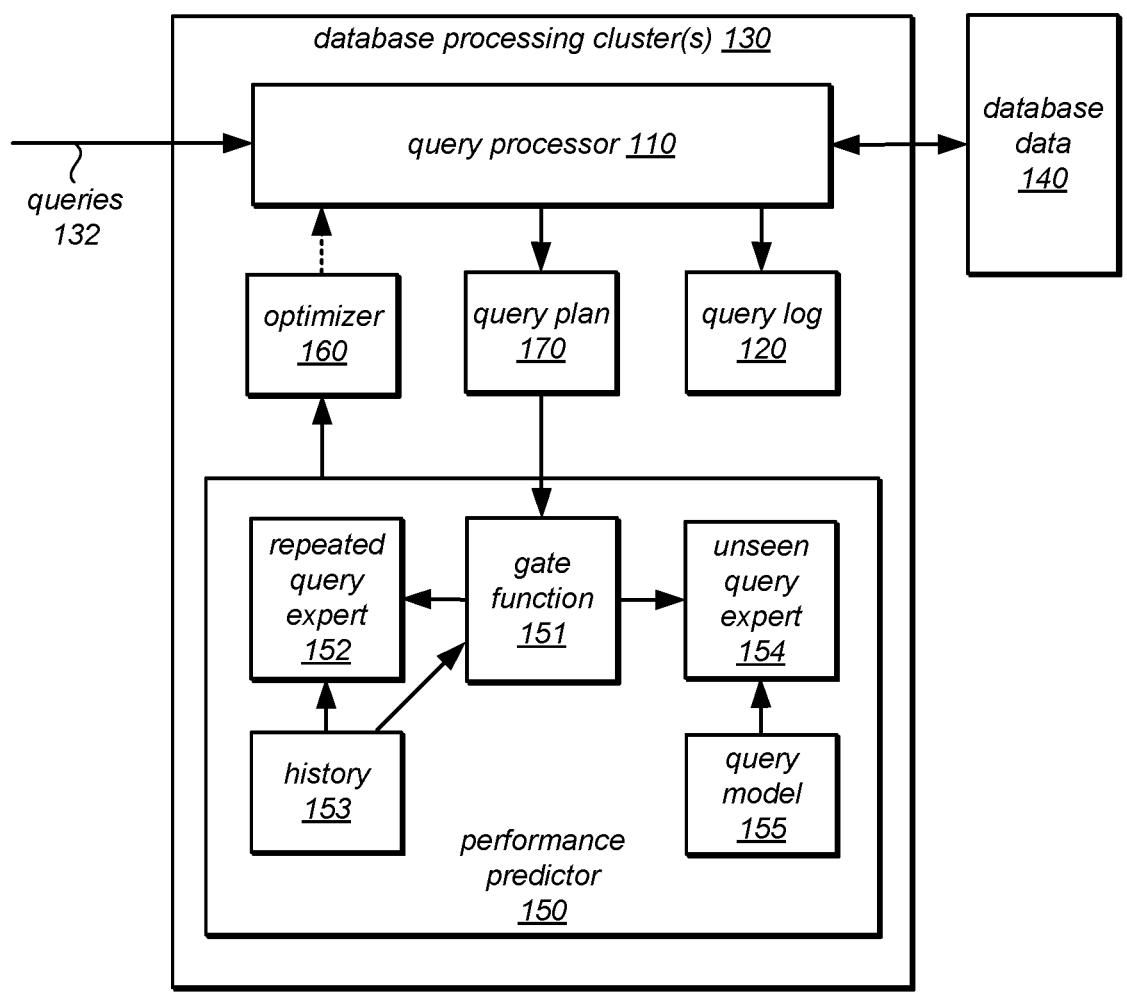
FIG. 1 illustrates a logical block diagram of predicting query performance for optimizing database processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of predicting query or access performance for optimizing database processing are described herein. Serverless database offerings aim to provide high performance and low cost with minimal intervention on configuration of a database system by users. Current techniques, however, do not always meet this goal. For example, users may choose a serverless cluster size which gives them high enough performance at low enough cost as determined by running experiments with different cluster configurations. After this initial determination is made, serverless resources may increase only with numbers of concurrent users, without user intervention, via scaling to add additional clusters to provide access to a database. However, users may have to perform a new analysis whenever workload characteristics change (e.g., the underlying data size may increase or the distribution of "large" vs "small" queries in a workload shifts). Additionally, achieving the lowest cost and best performance on a heterogeneous workload may require using heterogeneous hardware (e.g. different cluster sizes). To do this, users would need to set up multiple workgroups and a fixed assignment of users to each workgroup. The workgroup configurations and assignment would also need to change as workload properties change.

The ability to predict aspects of execution performance for queries submitted to a database system may enable right-sizing of resources for providing access to a database that offers a serverless experience. A future workload may be predicted for a database system using analysis of queries submitted for execution. A feature vector for a query may be determined according to a query plan for the query. If the feature vector has not been previously seen, or has not been sufficiently seen, by the database system, a machine learning inference may be used to predict performance characteristics of the query, the machine learning system trained using previous feature vectors and performance characteristics of executed queries. If the feature vector has been sufficiently seen previously by the database system, a history of performance characteristics of previous queries with similar or the same feature vector may be used to predict the performance characteristics. The predictions may then be used to configure or reconfigure processing cluster(s) of the database system.

FIG. 1 illustrates a logical block diagram of predicting query performance for optimizing database processing, according to some embodiments. Various optimizations of a database operation may be performed by an optimizer 160 for a database system (e.g., a standalone database system or a database service like database service 210 in FIG. 2). Optimizer 160 may take predictions from a performance predictor 150 to make optimization decisions, such as to pack queries for concurrent execution, to determine compilation optimizations for query segments, to prioritize queries in queues, to prioritize optimization tasks, to scale database clusters and so forth, for one or more database processing clusters 130. It should be understood, however, that these are merely examples of database performance optimizations and are not intended to be limiting. Database processing clusters 130 may provide access to database data 140 (e.g., performing one or more queries 132).

In performance of a query, a query processor 110 may generate a query plan 170 that may be provided to the performance predictor 150. From the query plan, the performance predictor may generate a query feature vector, a data object containing multiple elements of a feature space describing essential operations, or elements, of the query being performed. While individual elements of the feature vector may vary based on the database, in various embodiments, the purpose of the feature vector is to identify similarities and differences between queries irrespective of the queries themselves. It should be noted that queries with identical feature vectors may not be matching queries or generate the same query results because there may be information lost when extracting the feature vectors from the query plan trees and rows in the query plan are an estimation as well and thus could be wrong or stale. Thus, the use of a feature vector derived from a query plan for a query ensures more consistent predictive results and more reliable identification of unique and repeated queries. It should also be noted that feature vectors may, in various embodiments, have varying numbers of dimensions and in many cases, be impractical to use directly in various steps in the prediction process. For that reason, various computational techniques, such as hashing, may be employed as part of analysis of the feature vectors, in various embodiments.

Once a feature vector for the query is determined, a gate function 151 may use the feature vector, or feature vector hash, to classify the query as either a repeated (seen) query or an unseen query. Different predictor experts may be employed depending on this classification. A repeated query expert 152 may make performance predictions for a query whose features have been previously seen by utilizing a performance history 153. For previously unseen, or rarely seen, query feature vectors, insufficient history, or no history, may exist. Therefore, unseen queries may receive predictions from an unseen query expert 154 that utilizes a machine learning model for queries 155. This machine learning model may be trained on previous query feature vectors and performance characteristics and may in some embodiments, be periodically be retrained, or fine tuned, using accumulated queries performed by the database system.

Additionally, the query processor 110 may, in some embodiments, store various information, such as query plans, query feature vectors, performance predictions, performance results and so forth, in a query log 120 to assist in performing and maintaining various aspects of the performance predictor. It should be understood, however, that these are merely examples of information that may be contained in a query log and are not intended to be limiting. An example using a query log 120 is discussed in further detail below in FIG. 8.

Note that the previous description of a database service is a logical description and thus is not to be construed as limiting as to the implementation of a query processing configurations, a database service, database data, and performance of queries, or portions thereof.

Figure 2:
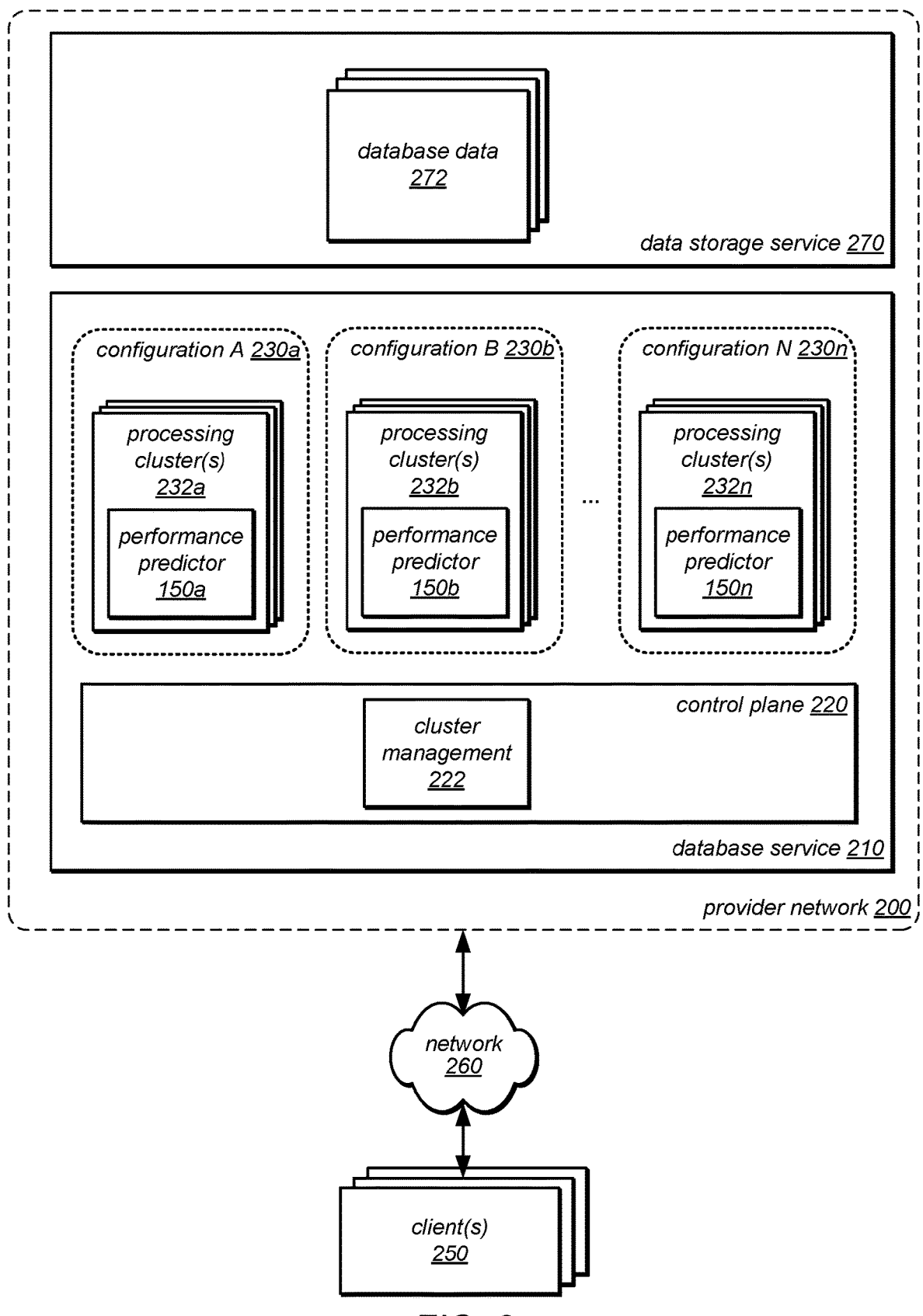
FIG. 2 is a logical block diagram illustrating a provider network offering a database service that implements predicting query performance for optimizing database processing for databases managed by the database service, according to some embodiments.

FIG. 2 is a logical block diagram illustrating a provider network offering a database service that implements predicting query performance for optimizing database processing for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Database users can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of database users within a certain latency requirement, a set of servers provided to a database user's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to database users on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes database user resources that are implemented on the cloud provider network (e.g., computing instances, containers, block storage volumes, databases, file storage). Data plane traffic generally includes non-administrative operations such as transferring database user data to and from the database user resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be included in various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database systems that are highly scalable and extensible. Queries may be directed to a database in database service 210 that is distributed across multiple physical resources, and the resource configurations, such as processing clusters 232, used to process the queries may be scaled up or down on an as needed basis.

Database service 210 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus in the description that follows database service 210 may be discussed according to the various features or components that may be implemented as part of a data warehouse service, including control plane 220, and processing clusters 232. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 9. Different subsets of these computing devices may be controlled by cluster management 222 of a control plane 220. Control plane 220, for example, may provide a cluster control interface to clients or users who wish to interact with the processing clusters, such as processing cluster(s) 232*a*, 232*b*, and 232*n* managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or database users, organizations, entities, or users) may wish to store and manage data using a database service 210. Processing clusters 232 may respond to various requests, including write/update/store requests (e.g., to write data into storage) or queries for data (e.g., such as a Server Query Language request (SQL) for particular data), as discussed below with regard to FIG. 5. For example, multiple users or clients may access a processing cluster to obtain data warehouse services. Processing clusters 232 may further make performance predictions using performance predictors 150, as discussed above in FIG. 1 and further discussed below in FIGS. 3-8. These predictions may be further used by cluster management 222 to maintain the configurations 230.

For databases manually managed by users, database service 210 may provide database endpoints directly to the clusters which allow the users manage in order to implement client applications that send requests and other messages directly to a particular cluster. Database endpoints, for example may be a network endpoint associated with a particular network address, such as a URL, which points to a resources, such as processing clusters 232 that are attached to the database for query processing. For instance, a client may be given the network endpoint "http://mycluster.com" to send various request messages to. Multiple clients (or users of a particular client) may be given a database endpoint for the same database. Various security features may be implemented to prevent unauthorized users from accessing the databases.

Processing clusters, such as processing clusters 232*a*, 232*b*, and 232*n*, hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 232 (or routed/redirect/assigned/allocated to processing cluster(s)) may be directed to local data stored in the processing cluster and/or remote data. Therefore, processing clusters may implement local data processing, such as local data processing, (discussed below with regard to FIG. 5) to plan and execute the performance of queries with respect to local data in the processing cluster, as well as a remote data processing client.

Database service 210 may implement different types or configurations of processing clusters. For example, different configurations A 230*a*, B 230*b*, and N 230*n*, may utilize various different configurations of computing resources, including, but not limited to, different numbers of computational nodes, different processing capabilities (e.g., processor size, power, custom or task-specific hardware, such as hardware optimized to perform different operations, such as regular expression searching, or other data processing operations), different amounts of memory, different networking capabilities, and so on. Thus, for some queries, different configurations 230 of processing cluster 232 may offer different execution times. Different configurations 230 of processing clusters 232 may be maintained in different pools of available processing clusters to be attached to a database. Attached processing clusters may then be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "primary cluster" or "main cluster." Primary clusters may be reserved, allocated, permanent, or otherwise dedicated processing resources that store and/or provide access to a database for a client, in some embodiments. Primary clusters, however, may be changed. Techniques to resize or change to a different configuration of a primary cluster may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity for a primary cluster. Control plane 220 may manage cluster pools by managing the size of cluster pools (e.g., by adding or removing processing clusters based on demand).

As databases are created, updated, and/or otherwise modified, snapshots, copies, or other replicas of the database at different states may be stored separate from database service 210 in data storage service 250, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object.

In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210, format independent data processing service 220, and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
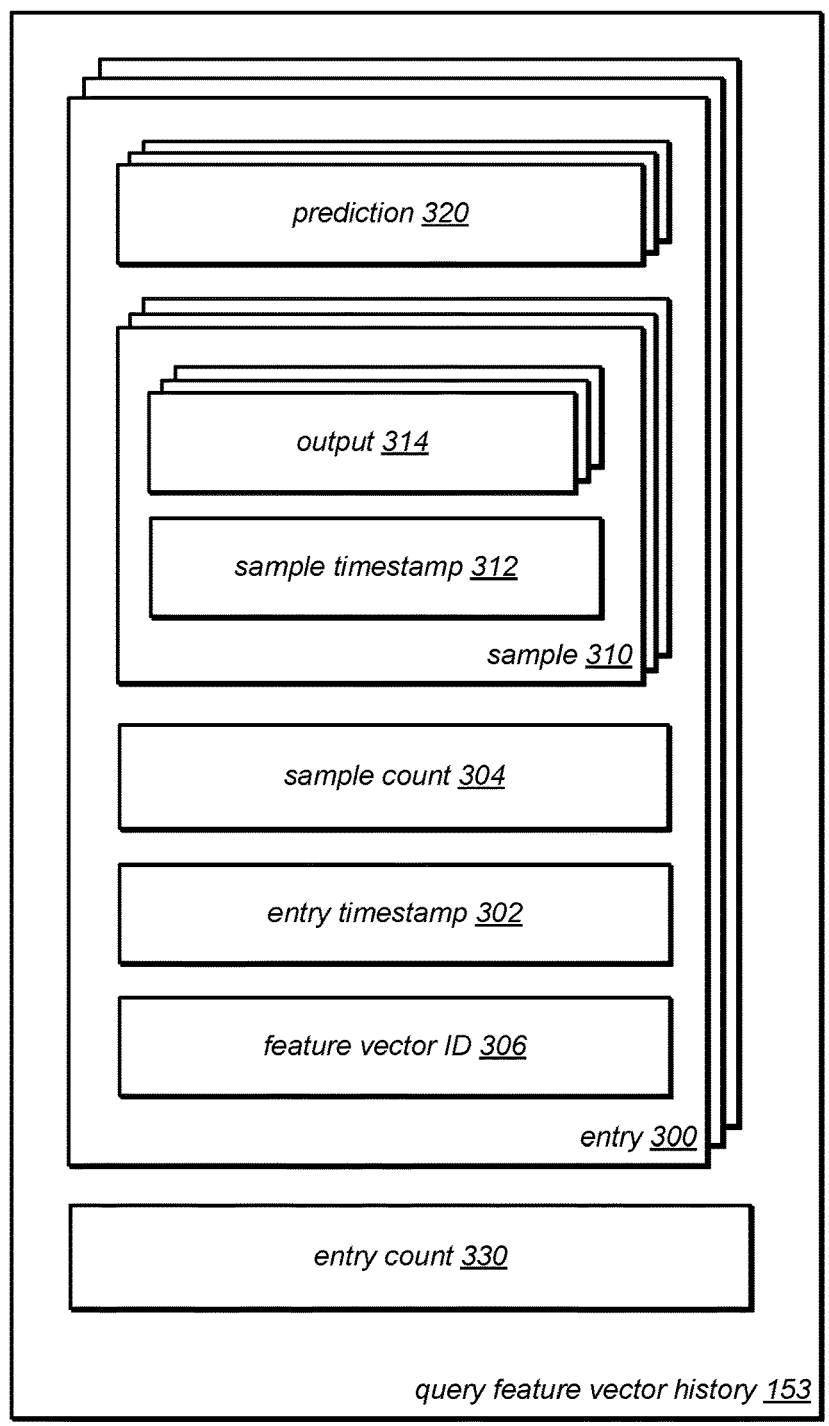
FIG. 3 is a logical block diagram illustrating a feature vector history, according to some embodiments.

FIG. 3 is a logical block diagram illustrating a feature vector history, according to some embodiments. A query feature vector history 153, as introduced in FIG. 1, may include entries 300 for multiple feature vectors, where a count of the entries may be maintained in some embodiments in a entry count 330. A feature vector may be derived from a query plan generated for a query, where the query feature vector may contain multiple elements of a feature space describing essential operations, or elements, of the query being performed. For each entry 300, a feature vector ID 306 identifying the corresponding feature vector may be stored, the feature vector ID 306 generated, for example, using a hash of the feature vector. In addition, each entry may include samples 310 and predictions 320 for one or more performance characteristics, the performance characteristics describing aspects of performance of the individual queries to enable scaling and management of the database system. Examples of such characteristics may include processing resource requirements, memory requirements and execution times, in various embodiments. It should be understood, however, that these are merely examples of performance characteristics and are not intended to be limiting. A number of samples may be stored, in some embodiments in a sample count field 304. In addition, timestamps identifying respective creation times for samples and entries may be maintained in the sample timestamp 312 and entry timestamp 302, in some embodiments, to assign in identifying samples and entries to remove or replace in maintenance of the history 153. Examples of use of these timestamps is discussed in further detail below in FIG. 7.

A particular feature vector entry may have a number of samples represented in the sample count 304, the samples generated from results of previous executions of queries with the feature vector. For each performance characteristic, there may be "count" samples 3034 of the performance characteristic as well as a prediction 320 generated from the respective sample values. In some embodiments, this prediction may be an average or other statistical calculation, although this is merely an example prediction, any number of other predictions may be envisioned and the above example is not intended to be limiting.

Figure 4:
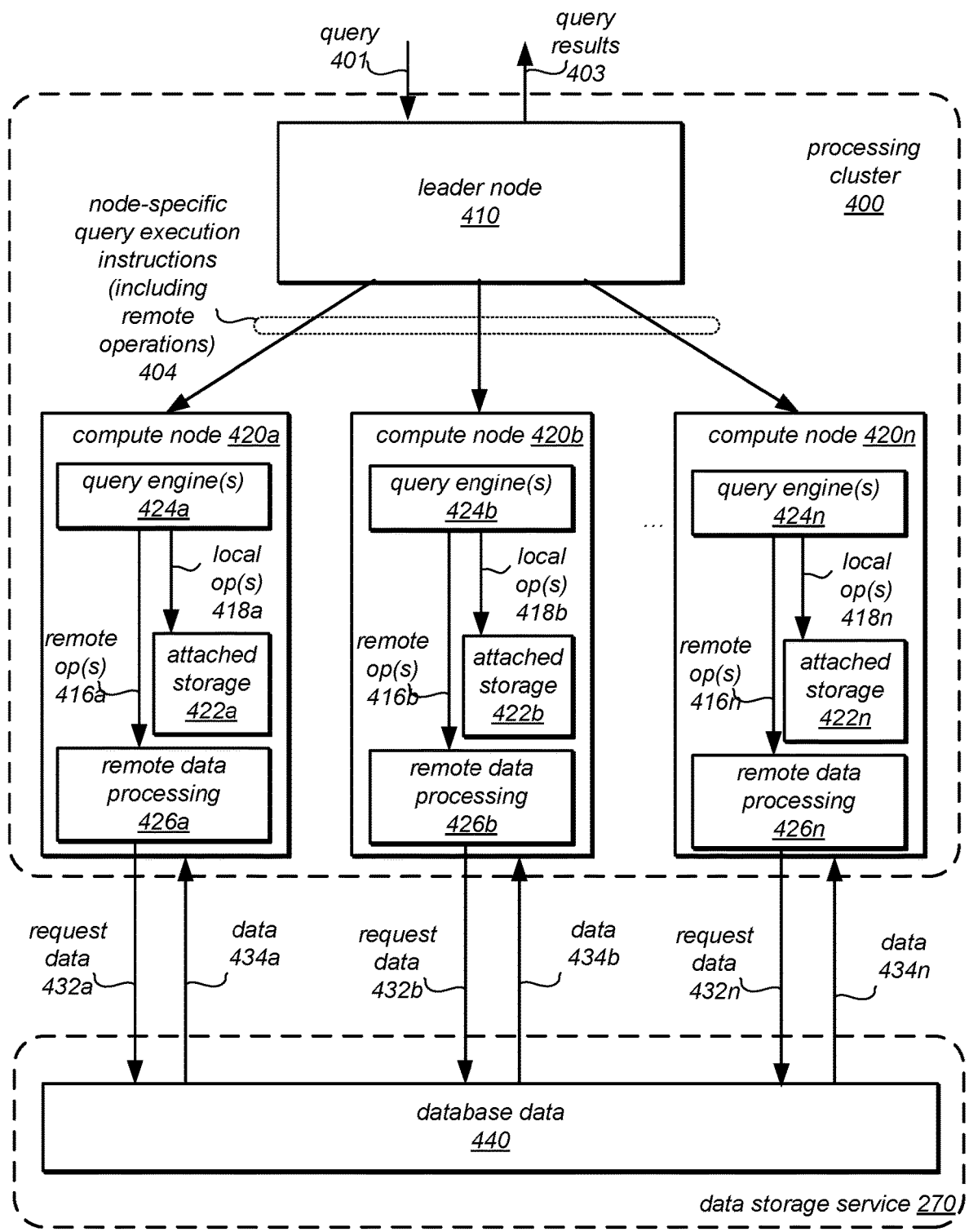
FIG. 4 is a logical block diagram illustrating an example processing cluster of a database service, according to some embodiments.

FIG. 4 is a logical block diagram illustrating an example processing cluster of a database service, according to some embodiments. Processing cluster 400 may be query processing cluster, like processing clusters 232 discussed above with regard to FIG. 2, that distributes execution of a query among multiple computational (which may also be referred to as "compute") nodes. As illustrated in this example, a processing cluster 400 may include a leader node 410 and compute nodes 420a, 420b, and 420n, which may communicate with each other over an interconnect (not illustrated). Leader node 410 may implement query planning 412 to generate query plan(s), query execution 414 for executing queries on processing cluster 400 that perform data processing that can utilize remote query processing resources for remotely stored data (e.g., by utilizing one or more query execution slot(s)/queue(s) 417). As described herein, each node in a primary processing cluster 400 may include attached storage, such as attached storage 422a, 422b, and 422n, on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 400 is a leader node as illustrated in FIG. 4, but rather different nodes of the nodes in processing cluster 400 may act as a leader node or otherwise direct processing of queries to data stored in processing cluster 400. While nodes of processing cluster may be implemented on separate systems or devices, in at least some embodiments, some or all of processing cluster may be implemented as separate virtual nodes or instance on the same underlying hardware system (e.g., on a same server).

Leader node 410 may manage communications with clients, such as clients 250 discussed above with regard to FIG. 2. As discussed above with regard to FIG. 3, leader node 410 may communicate with proxy service 240 and may receive query 401 and return query results 403 to proxy service 240 (instead of communicating directly with a client application). Alternatively, in those embodiments where leader node 410 implements database query queue 320 and query routing 330 as a primary cluster, then leader node 410 may act as the proxy for other, secondary clusters, attached to the database, and may return query results directly to a client application.

Leader node 410 may be a node that receives a query 401 from various client programs (e.g., applications) and/or subscribers (users) (either directly or routed to leader node 410 from proxy service 240), then parses them and develops an execution plan (e.g., query plan(s)) to carry out the associated database operation(s)). More specifically, leader node 410 may develop the series of steps necessary to obtain results for the query. Query 401 may be directed to data that is stored both locally within processing cluster 400 (e.g., at one or more of compute nodes 420) and data stored remotely. Leader node 410 may also manage the communications among compute nodes 420 instructed to carry out database operations for data stored in the processing cluster 400. For example, node-specific query instructions 404 may be generated or compiled code by query execution 414 that is distributed by leader node 410 to various ones of the compute nodes 420 to carry out the steps needed to perform query 401, including executing the code to generate intermediate results of query 401 at individual compute nodes may be sent back to the leader node 410. Leader node 410 may receive data and query responses or results from compute nodes 420 in order to determine a final result 403 for query 401.

A database schema, data format and/or other metadata information for the data stored among the compute nodes, such as the data tables stored in the cluster, may be managed and stored by leader node 410. Query planning 412 may account for remotely stored data by generating node-specific query instructions that include remote operations to be directed by individual compute node(s). Although not illustrated, in some embodiments, a leader node may implement burst manager to send 406 a query plan generated by query planning 412 to be performed at another attached processing cluster and return results 408 received from the burst processing cluster to a client as part of results 403.

In at least some embodiments, a result cache 419 may be implemented as part of leader node 410. For example, as query results are generated, the results may also be stored in result cache 419 (or pointers to storage locations that store the results either in primary processing cluster 400 or in external storage locations), in some embodiments. Result cache 419 may be used instead of other processing cluster capacity, in some embodiments, by recognizing queries which would otherwise be sent to another attached processing cluster to be performed that have results stored in result cache 419. Various caching strategies (e.g., LRU, FIFO, etc.) for result cache 419 may be implemented, in some embodiments. Although not illustrated in FIG. 4, result cache 419 could be stored in other storage systems (e.g., other storage services, such as a NoSQL database) and/or could store sub-query results.

Processing cluster 400 may also include compute nodes, such as compute nodes 420a, 420b, and 420n. Compute nodes 420, may for example, be implemented on servers or other computing devices, such as those described below with regard to computer system 1000 in FIG. 9, and each may include individual query processing "slices" defined, for example, for each core of a server's multi-core processor, one or more query processing engine(s), such as query engine(s) 424a, 424b, and 424n, to execute the instructions 404 or otherwise perform the portions of the query plan assigned to the compute node. Query engine(s) 424 may access a certain memory and disk space in order to process a portion of the workload for a query (or other database operation) that is sent to one or more of the compute nodes 420. Query engine 424 may access attached storage, such as 422a, 422b, and 422n, to perform local operation(s), such as local operations 418a, 418b, and 418n. For example, query engine 424 may scan data in attached storage 422, access indexes, perform joins, semi joins, aggregations, or any other processing operation assigned to the compute node 420.

Query engine 424a may also direct the execution of remote data processing operations, by providing remote operation(s), such as remote operations 416a, 416b, and 416n, to remote data processing clients, such as remote data processing client 426a, 426b, and 426n. Remote data processing clients 426 may be implemented by a client library, plugin, driver or other component that sends request sub-queries to be performed by data storage service 220 or requests to for data, 432a, 432b, and 432n. As noted above, in some embodiments, Remote data processing clients 426 may read, process, or otherwise obtain data 434a, 434b, and 434c, in response from database data 440 in data storage service 270, which may further process, combine, and or include them with results of location operations 418.

Compute nodes 420 may send intermediate results from queries back to leader node 410 for final result generation (e.g., combining, aggregating, modifying, joining, etc.). Remote data processing clients 426 may retry data requests 432 that do not return within a retry threshold.

Attached storage 422 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 5:
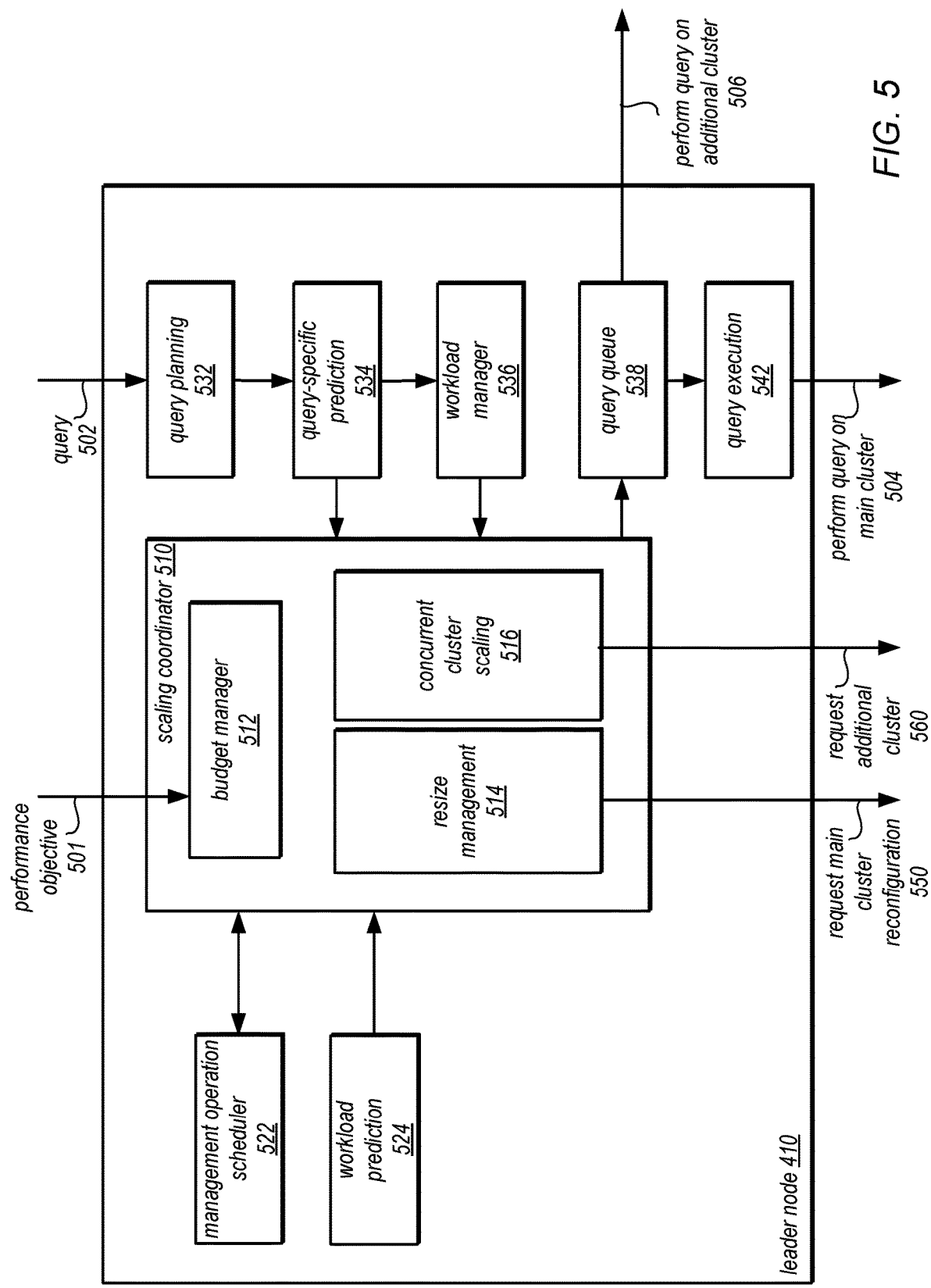
FIG. 5 is a logical block diagram illustrating an example leader node that implements predicting query performance for optimizing database processing, according to some embodiments.

FIG. 5 is a logical block diagram illustrating an example leader node that implements predicting query performance for optimizing database processing, according to some embodiments. Leader node 410 may implement scaling coordinator 510. Scaling coordinator 510 may implement budget manager 512 which may obtain a specified performance objective 501 and determine a performance budget to provide to resize management 514 and concurrent cluster scaling 516. Performance objective 501 may, in some embodiments, correspond to different scaling aggressiveness levels. For example, pre-populated "levels" for example, may correspond to a hard-coded aggressiveness, A, the number of database processing unit (DPU)-seconds the database user can use per GB of the underlying tables touched by the query workload. Each query adds [A*(scan size in GB)] DPU-seconds to the budget. For example, if the user workload consists of 1000 queries, each of which scans a 100 GB table, and A=0.5 then scaling coordinator 510 can use a budget of 50,000 DPU-seconds to run this workload. The budget is passed to resize management and to concurrent scaling cluster scaling 516, to make sure additional clusters are not added if the budget would be exceeded (so a main cluster size is not chosen that is too large). Budget manager 512 can report up-to-date remaining budget values (e.g., DPU) in some embodiments. In some embodiments, the budget may be also determined based on workload forecast.

Management operation scheduler 522 may help to schedule when background operations, including some scaling actions are performed. Workload prediction 524 may use historical data apply a machine learning model and generate prediction of future workloads over time. Workload prediction may occur for various time horizons (e.g., next hour, next 24 hours, etc. and offer amounts of work for periods within different horizons (e.g., predicted resources utilized within 5 minute intervals). Resize management 514 may change cluster configuration based on predicted workload (e.g., at specified intervals or times when the resize evaluation is triggered (e.g., every 24 hrs). Concurrent cluster scaling 516 likewise may request an additional cluster 560 in anticipation of a query workload to add further query processing capacity.

Scaling coordinator 510 may determine which cluster, either main or a specific additional cluster, the query should run on, and creating such a cluster if necessary. For each query, scaling coordinator 510 determines whether that query should scale based on its predicted execution time and predicted peak memory usage, or whether the queuing time is large enough to merit starting a new cluster. For example, concurrent cluster scaling 516 may also perform on-demand scaling when queries are received. For example, a query 502 may be received and a query plan generated at 532. Then query specific predictions of various computing resources and performance of the query may be made, as indicated at 534.

For example, query-specific prediction 534 may be made using one or more machine learning models that may be trained to predict query execution performance, both on the current main cluster (and an additional clusters already provisioned for the database) but on other potential clusters with different configurations. For example, query-specific prediction 534 may include peak memory predictors (e.g., how much memory will this query consume at its peak), run time predictors (e.g., how long will this query take on a different cluster size), and command-specific predictors (e.g. COPY, external table, etc.).

The following description provides for an example embodiment of predictors providing query specific prediction 534. When making a prediction of execution time for a given query q to be executed on a s nodes cluster, there are two possible models to use. First, is a globally trained scaling model $M_g$ that was trained offline to directly predict execution time of a given query at any allowed scale s∈S={4, 8, 16, 32, 64, 128} and second is a local scaling model KNN, $M_r$, which is a prediction based on the actual execution time observed in the past r repetitions at the current main cluster. It may be that $M_r$ is better than $M_g$ in terms of absolute execution time, when q is a repeating query and have seen more than r repetitions at the main cluster. However, $M_g$ was trained with much more data and is expected to better capture the scalability of the query, e.g., the trend of execution time at different scales.

Scaling coordinator 510 may be targeted to optimize the overall/mean utilization (e.g.price)—performance. So, instead of greedily picking the best price-performance for each query, it may be formulated as a Multi-Armed Bandit problem and use Thompson sampling to balance exploration and exploitation, and the controller may need uncertainty of each prediction to formulate the prior and likelihood distribution of price-performance objective.

In some embodiments, an ensemble prediction technique may be used for query-specific prediction 534. For example, for a given query q, $M_g$ makes prediction for all possible scales $s \in S$ and $M_r$ makes prediction for a subset of scales $s \in S_r \subset S$. To fuse $M_g(q, S)$ and $M_r(q, S_r)$ so that (1) the trend of $M_g(q, S)$ is preserved and (2) the revised predictions are closer to $M_r(q,S_r)$. Accordingly, there may be multiple methods to get the predicted value and the uncertainty. A first method may be to find the weight w and to minimize L where $L(q,S_r) = \Sigma_{s \in S_r} \|M_g(q,S) - M_r(q,s)\|^2$. Then, $M'_g = wM_g(q, s)$ as the ensemble model to make prediction $s \in S$. The solution to w may be described as:

$$\arg\min_w L = \left( \frac{\sum_{s \in S_r} M_r(q, s) M_g(q, s)}{\sum_{s \in S_r} M_g(q, s)^2} \right).$$

Another method may be described as: $L(q,S) = \Sigma_s \Sigma_r \|w_i M_g(q, s) - M_r(q,s)\|^2 + \lambda \Sigma_s \|w_i - 1\|$. Uncertainty can be obtained using different techniques, such as Quantile loss and Gaussian process.

In some embodiments, scaling coordinator 510 may use a formulation to assign query performance locations, alpha-price-performance ($PP_\alpha$) for a query q, cluster size c and runtime $R(q, c)$: $PP_\alpha(q, c) = R(q, c) \cdot c^\alpha$. In this formulation, $\alpha$ may be used to be the aggressiveness, the higher it is the more performance prioritized and the lower it is the more resource utilization efficiency (e.g., lower cost) is prioritized. The value of a may be determined according to a workload prediction according to the budget and performance objective, in some embodiments.

In some embodiments, scaling coordinator 510 may implement the following technique to assign a cluster to an incoming query. Active clusters are accepting new queries and will incur customer cost. Inactive clusters are not accepting new queries (for cost reasons) but are running existing queries and therefore incurring customer cost. Pending clusters are clusters that are being prepared by the burst manager but are not yet ready to run queries. Auto-task clusters are running at least one auto-task. They may also be running user queries. When a query arrives, the scaling coordinator 510 generates a list of candidates for clusters to run on. Candidates include all available clusters, including pending ones, and new burst clusters drawn from a hardcoded list of sizes: {2, 4, 8, 16, 32, 64}CNs. Each candidate has an associated runtime and billable cost, which is combined into alpha-price-performance. Candidates may additionally be marked ineligible due to budget or other constraints. Of the remaining eligible candidates, the one with the lowest alpha-price-performance is chosen.

When a query arrives, the scaling coordinator 510 generates a list of candidates for clusters to run on. Candidates include all available clusters, including pending ones, and new burst clusters drawn from a hardcoded list of sizes: {2, 4, 8, 16, 32, 64} CNs. Each candidate has an associated runtime and billable cost, which is combined into alpha-price-performance. Candidates may additionally be marked ineligible due to budget or other constraints. Of the remaining eligible candidates, the one with the lowest alpha-price-performance is chosen. Given a query q and candidate cluster c:

Baseline Runtime (r_0): The scaling predictor provides an estimate of the expected runtime r_c on a cluster, along with a measure of uncertainty, e.g. standard deviation of the sample mean σc. Sample r_0 from N (rc, σc). Incorporating uncertainty has the benefit of helping to avoid repeating mistakes due to predictor inaccuracies Spilling Penalty (s) Let M be the output of the memory predictor (estimated peak memory). Let mc be the maximum allowed per-query allocation on c. Estimate the effect of spilling on runtime as r0+γc(M–mc), where r0 is the execution time from the scaling predictor and γ is the average per-compute-node latency incurred per MB of spillage. γ is an empirically determined constant with units seconds-per-MB.

Queuing Penalty (w): Maintain an exponentially weighted moving average (EWMA) of queueing head latency for each attached cluster, and use this to estimate how long q will have to wait in the queue before starting to execute. Note that queues are always emptied in FIFO order, Prepare Delay (p): If c is a new cluster, add a prepare delay to the runtime to reflect the time the query will have to wait before it can run on c. This is guc set to the P95 burst prepare time P, but could, in some embodiments, be adjusted based on observed prepare delays. If c is a pending cluster, this delay is the max(P−time spent preparing so far, P/4).

Billable Runtime (B): r_0+s. Intended to capture time the query is actually using cluster resources.

Billable Cost C: B*c*8 (c is the number of nodes), which reflects how much this query would bill if run in isolation.

Total Runtime (R): r_0+s+w+p. This is the estimated response time to the client.

Penalty: the alpha-price performance of this query: RCα. The query is assigned to the candidate cluster with the minimal penalty.

Ineligibility: A candidate cluster is ineligible if:
  It is active or pending and the incurred cost would exceed the available budget.
  It is inactive and the cost of running this cluster for 5 minutes (adjustable via GUC) would exceed the available budget.
  It is pending and the database has reached the maximum allowed number of burst clusters.

When a query is assigned to a particular burst cluster, it is allowed to run on any burst cluster of that size but may be not on any other cluster, in some embodiments. If a query is in the queue longer than GUC rightsizing_obey_scaling_duration_max_sec.

A solution is to modify the scaling predictor: Use data from actual runs of identical or similar queries and weight that more highly than the model-based prediction. This should provide more accurate predictions. Provide an uncertainty for the prediction: Var(E[R]), where R is the random variable for the runtime. Scaling coordinator 510 may use the uncertainty for Thomson sampling: given a set of candidates with penalties P_c(R) that are random variables, it chooses candidate c with probability Pr [Pc(R)=minc' Pc' (R)] In the above control flow, this is done by sampling r_0 from a normal distribution with the provided uncertainty, computing the penalty deterministically, and then choosing the cluster with the lowest penalty.

The control flow above acquires new clusters only in the case of a large query, whose runtime is long enough and which scales well enough to make a larger cluster worth the extra preparation time. However, it may be desirable to acquire a new cluster for shorter queries, e.g. in the presence of queueing. For this, use a loop that's separate from the above query flow. Every 10 seconds, a background task re-evaluates the activity group of every cluster and decide whether to acquire more. Pending clusters are easy since they have not been attached yet. However, other clusters may need to transition between active and inactive to avoid cost escalation. For example, if all clusters were kept active, each cluster may service a low load of queries, but the combination of clusters incurs a very large cost.

Scaling coordinator 510 keeps a history of the most recent 5 minutes of queries, along with their scaling runtime predictions. Let's suppose there are A attached active clusters, excluding main. Let S be a set of sets of clusters, comprising: All A clusters [1 set] The set of all but one of the attached active clusters [A sets] All A attached clusters plus one more of each size [A sets]. On each of these A+1 sets of clusters, replay the query history (using predicted runtimes, not actual) and obtain an average response time R and billed cost C. Choose the set with the best alpha-price-performance (R, C) that is also under budget for the 5-min interval. If the set is from (2), mark as inactive the cluster that was left out. If the set is from (3), prepare the extra cluster.

Resize management 514 may be responsible for determine the target size of the main cluster and the best value of a, in some embodiments, that produces the best performance for the given main cluster size and budget By default, resize management 514 runs once per day, but will run more often for new customers (every 10 min for the first two hours, then every hour for the first two days), in case need to resize more quickly for them. The input to the policy optimizer is a workload forecast, provided by workload prediction 524, which includes aggregated statistics of the predicted workload over the next day. Metrics needed from the forecast: peak memory distribution, runtime distribution, total scan size, and number of queries split out by memory buckets (bucket boundaries at 20% of total cluster memory for sizes {2, 4, 8, 16, 32, 64}). Total scan size is used to forecast the budget.

The following is an example algorithm to determine target cluster size using a slider that specifies different performance objectives:

Inputs: forecast F, current cluster state, performance objective
Outputs: {main size}
Parameters: budget_buffer=0.8
Algorithm
  budgets=[ ]
  While not aborted or timeout not reached:
    Produce a query trace Q from the forecast
    budget=forecasted budget of Q assuming current slider position
    For main size in {2,4,6,8 ... }:
      for alpha in (0.1, 0.5, 0.9, 1.3, 1.7):
        tot_pen[main size]=0
        simulate scaling coordinator on Q
        and compute
        tot_pen[main size, alpha]+=cluster cost budgets+=[budget]
    main size, alpha=argmax tot_pen[main size, alpha]s.t. tot_pen[main size, alpha]
    <|num_traces|*budget_buffer*mean(budget)
    urgency=tot_pen[cur_size, cur_alpha]/tot_pen[main_size, alpha] return main_size, alpha, urgency Then, workload manager 536 may request scaling coordinator to assign query performance locally on main or remote. The assignment may be made and the query queued in queue 538. If locally executed, query execution 542 may instruct compute nodes to perform the cluster, as indicated at 504. For remote execution a request to perform the query on an additional cluster 506 may be sent.

Although FIGS. 2-5 have been described and illustrated in the context of a provider network implementing a database service, like a data warehousing service, the various components illustrated and described in FIGS. 2-5 may be easily applied to other database services that can utilize scaling query processing resources for efficient utilization and performance. As such, FIGS. 2-5 are not intended to be limiting as to other embodiments of predicting a future workload for optimizing database processing for satisfying a performance objective.

Figure 6:
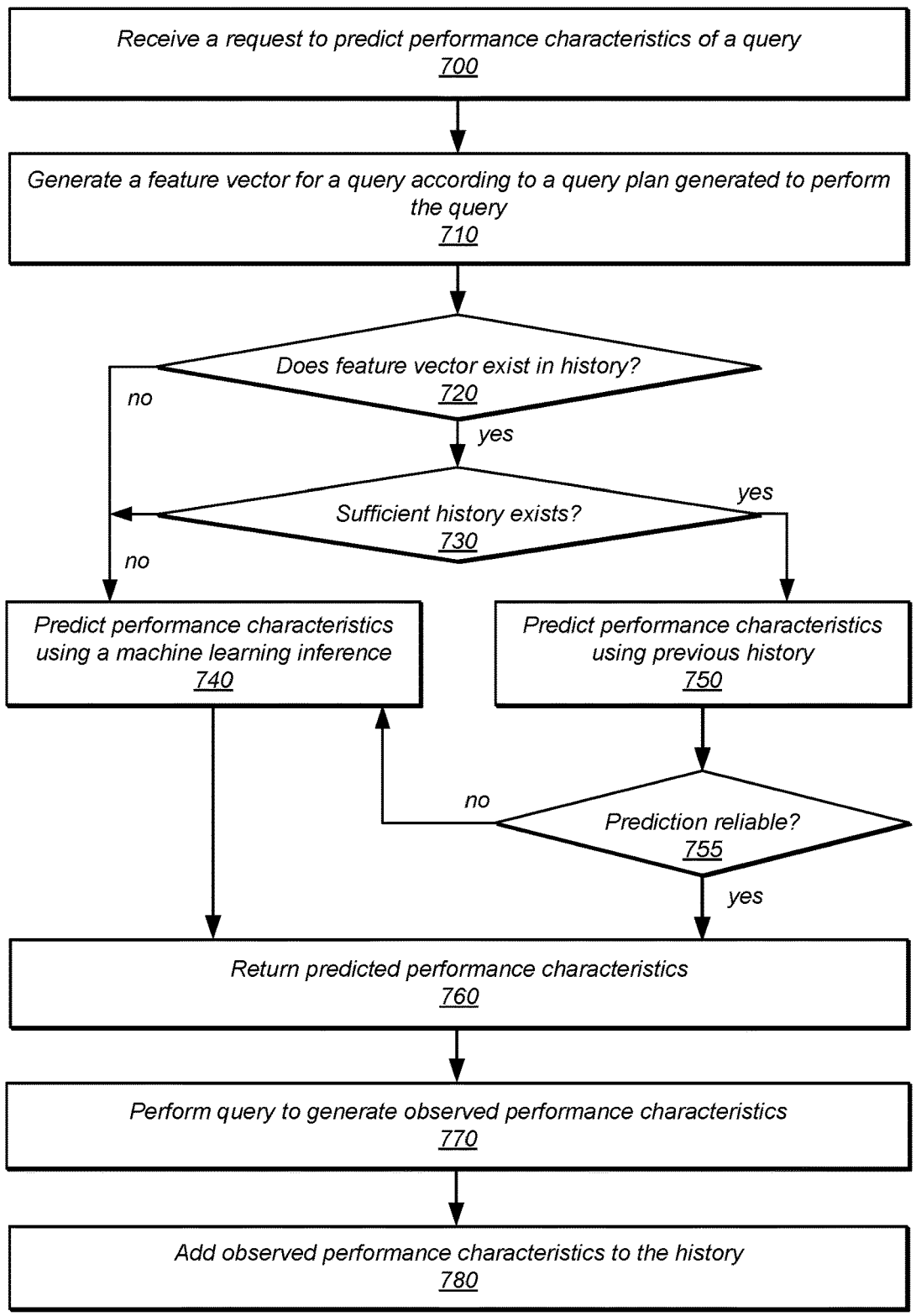
FIG. 6 is a high-level flowchart illustrating methods and techniques to implement predicting query performance characteristics for databases managed by the database service, according to some embodiments.

FIG. 6 is a high-level flowchart illustrating methods and techniques to implement predicting query performance characteristics for databases managed by the database service, according to some embodiments. The process begins at 700 where a request to predict one or more performance characteristics of a query may be receive, in various embodiments. In some embodiments, this request may include a query plan or may include information needed to obtain a query plan generated to execute the query, such as the query plan 170 as shown in FIG. 1. Once a query plan for the query has been obtained, as shown in 710 a feature vector for the query may be generated, the feature vector containing multiple elements of a feature space describing essential operations, or elements, of the query being performed. Individual elements of the feature vector may vary in various embodiments, however the feature vector is generated to provide reliable identification of operations performed by the query and thus may provide reliable identification of unique and repeated queries.

Once a feature vector for the query has been determined, the feature vector may be used to determine if a matching feature vector exists in a history of feature vectors, such as the history 153 as shown in FIG. 1. If the feature vector is defined in the history, as shown in as a positive exit in 720, the process may advance to 730. If the feature vector is not defined in the history, as shown in as a negative exit in 720, the process may advance to 740.

As shown in 730, if the feature vector is defined but lacks sufficient predictive information in the history, as shown in as a negative exit in 730, the process may advance to 740. This may occur if a count of samples in an entry for the feature vector in the history, such as the count 316 of FIG. 3, is below or fails to exceed a threshold value. If the feature vector has sufficient predictive information in the history, as shown in as a positive exit in 730, the process may advance to 750.

As shown in 740, for queries with insufficient history data, one or more performance characteristics of the query may be predicted in various embodiments by applying, such as by the unseen query expert 154 of FIG. 1, a machine learning model trained using previous feature vectors and performance characteristics of executed queries, such as discussed above in FIG. 5. This machine learning model, such as the query model 155 of FIG. 1, may be periodically tuned or retrained using cumulative historical observed performance characteristics as discussed further below in FIG. 8. The process may then advance to 760.

As shown in 750, for queries with sufficient history data, one or more performance characteristics of the query may be predicted in various embodiments using historical data for previously executed queries, such as discussed above in FIG. 5. A local scaling model, such as the repeated query expert 152 of FIG. 1, may provide a prediction based on the actual execution time observed in past executions of the query. In some embodiments, this prediction may be more accurate than a machine learning prediction in terms of absolute execution time, for repeating queries that have been executed more than a threshold number of times. However, in some embodiments, the prediction may not be more accurate than a machine learning prediction in terms of absolute execution time, therefore as shown in 755, the process may then determine if the prediction based on historical data is more reliable that a prediction using a machine learning model. If the prediction is unreliable, or less reliable relative to one from a machine learning model, as indicated by a negative result in 755, the process may advance to 740. If the prediction is reliable, or more reliable relative to one from a machine learning model, as indicated by a positive result in 755, the process may then advance to 760.

As shown in 760, prediction results may then be provided to the requestor, in various embodiments. Then, as shown in 770, the query may be executed to generate observed performance characteristics. These observed characteristics may then be recorded in the query feature vector history, such as the history 153 of FIG. 1, for future predictions, as discussed in further detail below in FIG. 7.

Figure 7:
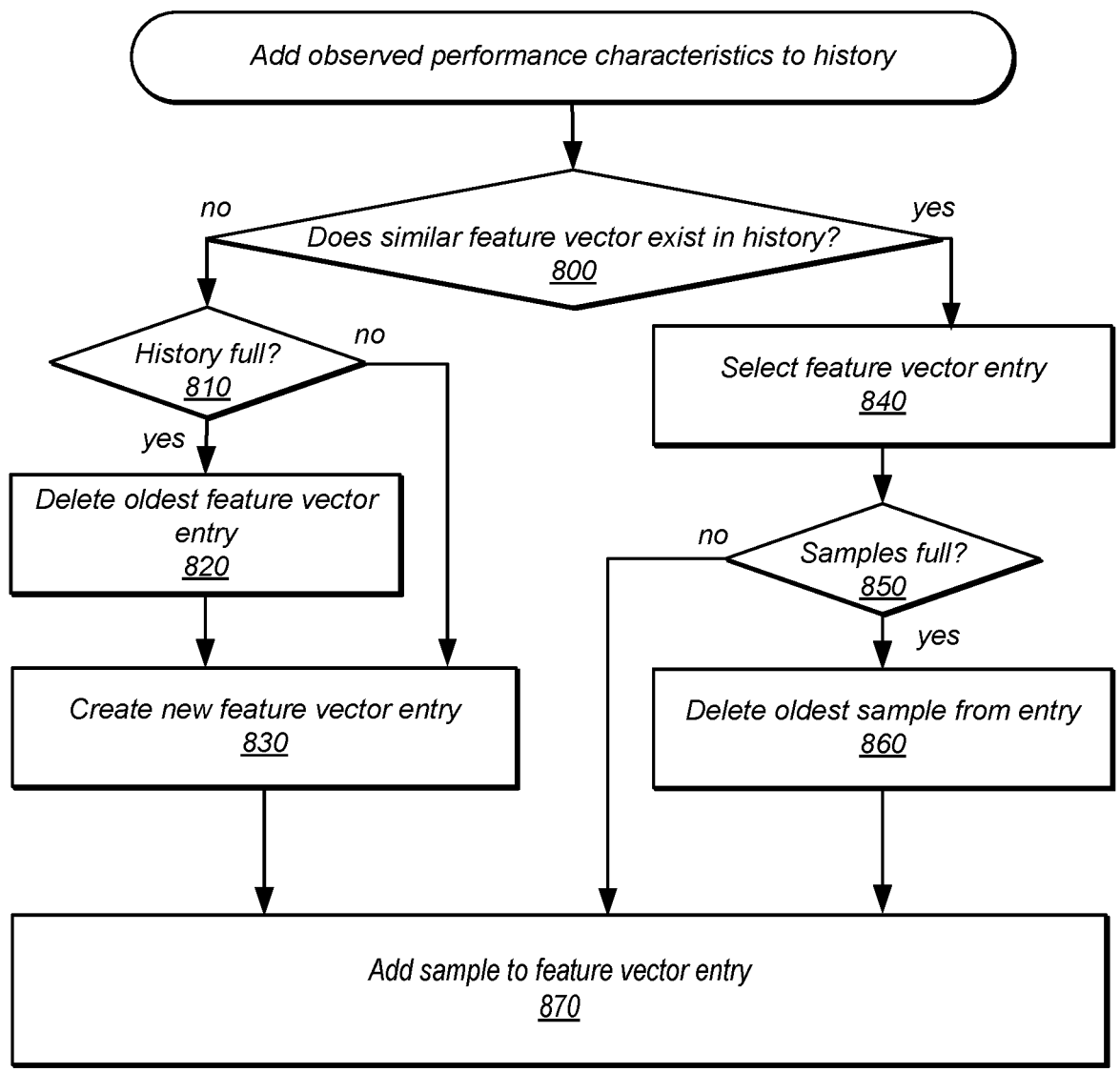
FIG. 7 is a high-level flowchart illustrating methods and techniques to implement adding observed performance characteristics to a history of queries, according to some embodiments.

FIG. 7 is a high-level flowchart illustrating methods and techniques to implement adding observed performance characteristics to a history of queries, according to some embodiments. A query feature vector with observed performance characteristics may be added to query feature vector history, such as the history 153 of FIG. 1, to support future predictions, in various embodiments. As shown in 800, a determination may first be made whether the feature vector matches or is similar to known feature vectors of entries of the history, such as a feature vector 300 as shown in FIG. 3. If the feature vector is similar to a vector defined in the history, as shown in as a positive exit in 800, the process may advance to 840. If the feature vector does not match any vector defined in the history, as shown in as a negative exit in 800, the process may advance to 810.

As shown in 810, a determination may be made whether the history is full and cannot support the addition of a new feature vector entry, in some embodiments. If the history is full, as shown in as a positive exit in 810, the process may advance to 820. If the history is not full, as shown in as a negative exit in 800, the process may advance to 830.

As shown in 820, and oldest feature vector entry may be selected and deleted from the history. In some embodiments, this selection may be made according to a timestamp for the entry that is updated as samples are added to the entry. In other embodiments, the selection may be made according to a timestamp for the entry that is updated at creation time for the entry. It should be understood, however, that these are merely examples and that various replacement criteria may be used in various embodiments. After an entry has been deleted, as shown in 830, a new feature vector entry may created and identified according to the feature vector of query being added to the history. The process may then advance to 870.

As shown in 840, for feature vectors that exist in the history, a feature vector entry, such as the feature vector 300 as shown in FIG. 3, may be selected that matches the feature vector. Then, a determination may be made whether samples can be added to the entry. In some embodiments, a maximum number of samples for an entry may be enforced which in other embodiments, a maximum size for the entry or for the history may be enforced. Such examples, however, are not intended to be limiting and any number of reasons may exist to constrain a number of samples for an entry of the history. If the samples for the entry are full, as shown in as a positive exit in 840, the process may advance to 850. If the samples for the entry are not full, as shown in as a negative exit in 840, the process may advance to 870.

As shown in 850, and oldest sample may be selected and deleted from the entry. In some embodiments, this selection may be made according to a timestamp for the sample that is updated as the sample is added to the entry. It should be understood, however, that this is merely an example and that various replacement criteria may be used in various embodiments. After a sample has been deleted, as shown in 860, the process may then advance to 870.

As shown in 870, a new sample may then be created for the entry, the sample including sample values for individual ones of the performance characteristics, such as the performance characteristics 310 of FIG. 3. Adding sample values, such as the samples 314 of FIG. 1, for the various performance characteristics may, in some embodiments, cause the updating of additional data in the entry, such as incrementing a count of samples, such as the count 316 of FIG. 3, and the updating of averages for the respective characteristics, such as the averages 312 of FIG. 3. Once the sample has been added to the entry, the process is complete.

Figure 8:
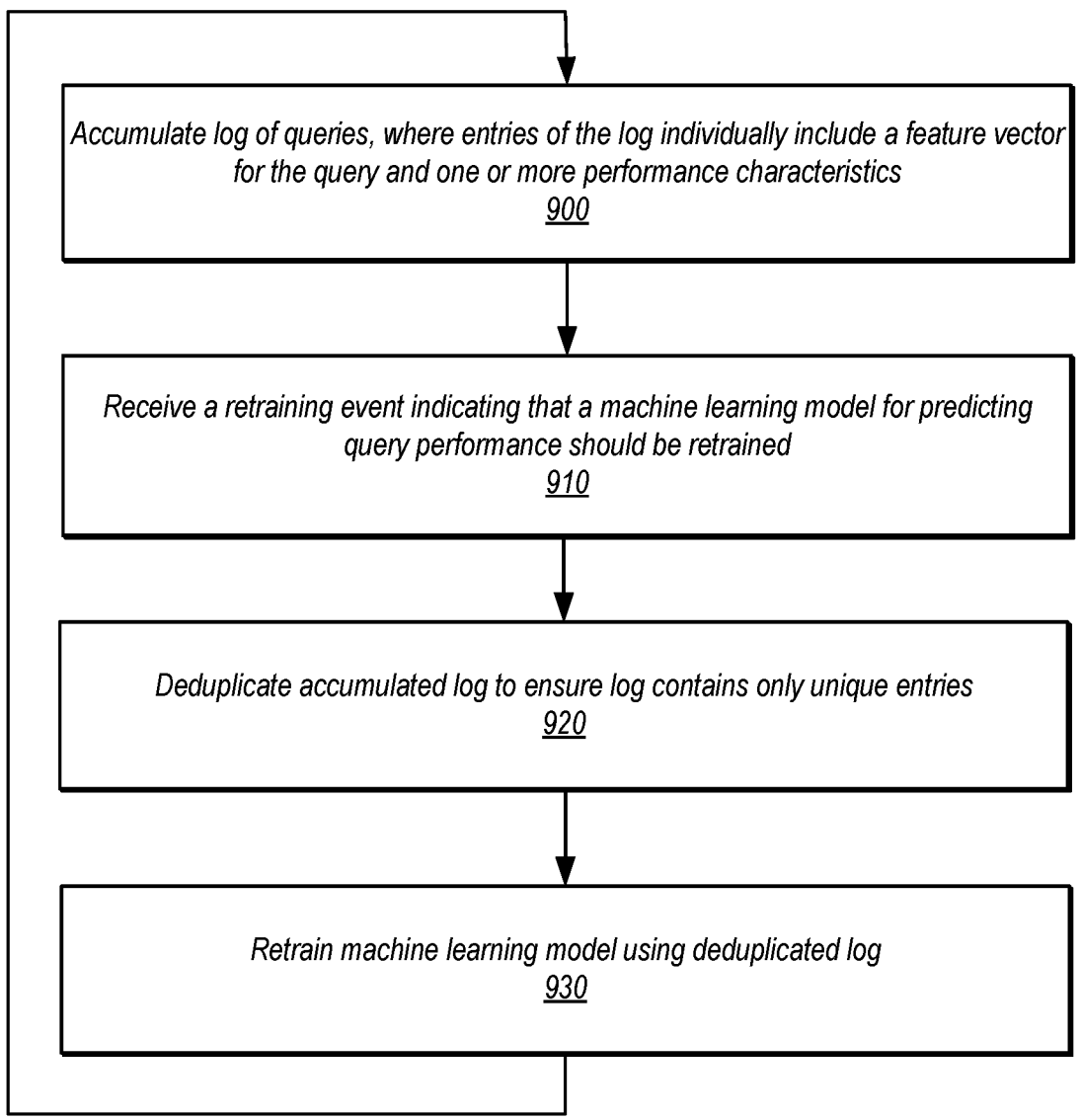
FIG. 8 is a high-level flowchart illustrating methods and techniques to implement updating a machine learning model to predict query performance characteristics for previously unseen queries, according to some embodiments.

FIG. 8 is a high-level flowchart illustrating methods and techniques to implement updating a machine learning model to predict query performance characteristics for previously unseen queries, according to some embodiments. The process begins at 900, where a log of query results, such as the query log 120 as shown in FIG. 1, may be accumulated. Individual entries in this log may include a feature vector and one of more performance characteristics of a query having the feature vector, in some embodiments. Maintaining a log of query results may, in some embodiments, not only support the training, tuning and retraining of machine learning models but may also support reconstruction of history data, such as the history 153 of FIG. 1. Thus, in the event of restarting a database system, such histories may not need to be maintained in persistent memory or at a data store, as the history may be constructed from the log of query results, in some embodiments.

Then, as shown in 910, a retraining event may be received, the event indicating that a machine learning model used in predicting query performance characteristics for unseen or rarely seen queries should be tuned or retrained. Various causes of retraining events may be envisioned. For example, in some embodiments, a retraining may be initiated upon request of a client via a programmatic interface. In other embodiments, retraining may be triggered by a number of accumulated log entries exceeding a threshold, while in still other embodiments, a retraining event may be trigger through an analysis of predicted results with corresponding observed results. Such examples, however, are not intended to be limiting and any number of reasons may exist to trigger a retraining event, in various embodiments.

As shown in 920, the log may then be deduplicated to remove redundant entries having common feature vectors, in some embodiments. By removing duplicate entries having a same query feature vector, data providing duplicate information may be eliminated, improving overall predictive performance of the machine learning model, in some embodiments. After deduplication, in some embodiments, the deduplicated log may contain unique feature vector entries, where feature vectors of different entries in the log are different from other entries in the log. Then, as shown in 930, the machine learning model may be tuned or retrained using the deduplicated log data. Once the model has been retrained, the process may return to 900.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
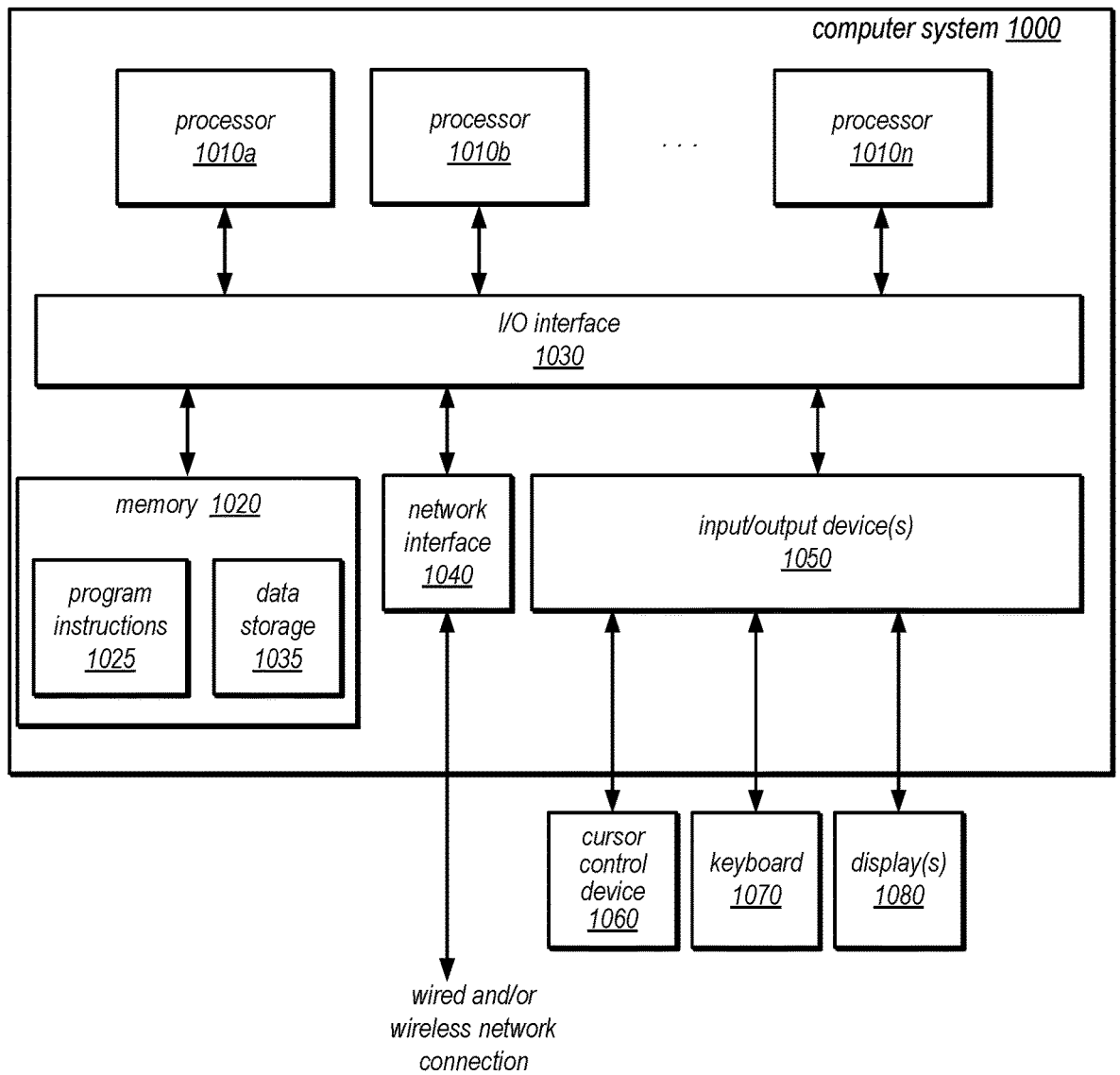
FIG. 9 illustrates an example system that implements the various methods, techniques, and systems described herein, according to some embodiments.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing devices, respectively comprising a processor and a memory that implement a database system configured to:
analyze a query plan of a query to identify a feature vector of the query;
responsive to determining that the feature vector matches respective feature vectors of a number of previous queries in a history of feature vectors, the number exceeding a threshold value, predict execution time of the query according to respective execution times of one or more previous queries identified in the history having the feature vector;
responsive to determining that the feature vector does not match respective feature vectors of a number of previous queries or matches respective feature vectors of a number of previous queries, the number not exceeding a threshold value, predict the execution times of the query according to a machine learning model trained according to respective execution times and feature vectors of a plurality of queries;
perform the query to generate an observed execution time for the query;
responsive to determining that the feature vector is recognized in a history of feature vectors of previous queries, update an entry in the history according to the feature vector and the one or more observed performance characteristics; and
responsive to determining that the feature vector is not recognized in the history of feature vectors of previous queries, add an entry to the history according to the feature vector and the one or more observed performance characteristics.

2. The system of claim 1, wherein responsive to the predicting, the database system is configured to perform one or more optimizations comprising at least one of:
a concurrent query execution determination;
a query compilation optimization determination;
a processing cluster scaling operation;
a query prioritization; and
a task prioritization.

3. The system of claim 1, the database system is configured to:
update a second history of previous performed queries according the feature vector and the one or more observed performance characteristics; and
retrain the machine learning model according the second history responsive to a number of previous performed queries exceeding another threshold value.

4. The system of claim 1, wherein to predict the execution time of the query the database system is configured to average the respective execution times of the one or more previous queries identified in the history having the feature vector.

5. A method to predict one or more performance characteristics of a query, comprising:
analyzing a query plan of the query to identify a feature vector of the query;
responsive to determining that the feature vector matches respective feature vectors of a number of previous queries in a history of feature vectors, the number exceeding a threshold value:
predicting the one or more performance characteristics of the query according to respective performance characteristics of one or more previous queries identified in the history having the feature vector; and
responsive to determining that the feature vector does not match respective feature vectors of a number of previous queries or matches respective feature vectors of a number of previous queries, the number not exceeding a threshold value:
predicting the one or more performance characteristics of the query according to a machine learning model trained according to respective performance characteristics and feature vectors of a plurality of queries.

6. The method of claim 5, wherein the one or more performance characteristics comprise execution time, compute resources and memory resources.

7. The method of claim 5, wherein predicting the one or more performance characteristics of the query according to the respective performance characteristics comprises averaging the respective performance characteristics of the one or more previous queries identified in the history having the feature vector.

8. The method of claim 5, further comprising:
selecting, by a database system performing the query, one of a plurality optimizations for the database system to perform according to the predicting, wherein the plurality of optimizations comprises:
a concurrent query execution determination;
a query compilation optimization determination;
a processing cluster scaling operation;
a query prioritization; and
a task prioritization;
performing, by the database system, the selected optimization for the database system.

9. The method of claim 5, further comprising:
performing the query at a database system to generate one or more observed performance characteristics for the query;
responsive to determining that the feature vector is recognized in a history of feature vectors of previous queries, updating an entry in the history according to the feature vector and the one or more observed performance characteristics; and
responsive to determining that the feature vector is not recognized in the history of feature vectors of previous queries, adding an entry to the history according to the feature vector and the one or more observed performance characteristics.

10. The method of claim 9, further comprising:
updating a second history of previous performed queries according the feature vector and the one or more observed performance characteristics; and
retraining the machine learning model according the second history responsive to a number of previous performed queries exceeding another threshold value.

11. The method of claim 5, further comprising:
constructing the history of feature vectors according to a log of previously executed queries.

12. The method of claim 5, further comprising predicting the one or more performance characteristics of the query according to the machine learning model responsive to determining that predicting the one or more performance characteristics of the query according to respective performance characteristics of one or more previous queries is unreliable.

13. The method of claim 5, wherein the predicting is performed by a database system of a database service implemented as part of a provider network.

14. One or more non-transitory, computer-readable storage media, storing program instructions that when executed on or across one or more computing devices cause the one or more computing devices to implement a database system that implements:
analyzing an access plan of the access to identify a set of features of the access;
responsive to determining that the set of features matches respective sets of features of a number of previous accesses in a history of sets of features, the number exceeding a threshold value:
predicting one or more performance characteristics of the access according to respective performance characteristics of one or more previous accesses identified in the history having the set of features; and
responsive to determining that the set of features does not match respective sets of features of a number of previous accesses or matches respective sets of features of a number of previous accesses, the number not exceeding a threshold value:
predicting the one or more performance characteristics of the access according to a machine learning model trained according to respective performance characteristics and sets of features of a plurality of accesses.

15. The one or more non-transitory, computer-readable storage media of claim 14, wherein the one or more performance characteristics execution time comprise execution time, compute resources and memory resources.

16. The one or more non-transitory, computer-readable storage media of claim 14, wherein predicting the one or more performance characteristics of the access according to the respective performance characteristics comprises averaging the respective performance characteristics of the one or more previous accesses identified in the history having the set of features.

17. The one or more non-transitory, computer-readable storage media of claim 14, the database system further implementing:
performing the access at a database system to generate one or more observed performance characteristics for the access;
responsive to determining that the set of features is recognized in a history of sets of features of previous accesses, updating an entry in the history according to the set of features and the one or more observed performance characteristics; and
responsive to determining that the set of features is not recognized in the history of sets of features of previous accesses, adding an entry to the history according to the set of features and the one or more observed performance characteristics.

18. The one or more non-transitory, computer-readable storage media of claim 17, the database system further implementing:
updating a second history of previous performed accesses according the set of features and the one or more observed performance characteristics; and
retraining the machine learning model according the second history responsive to a number of previous performed accesses exceeding another threshold value.

19. The one or more non-transitory, computer-readable storage media of claim 14, the database system further implementing:
constructing the history of sets of features according to a log of previously executed accesses.

20. The one or more non-transitory, computer-readable storage media of claim 14, wherein the predicting is performed by a database system of a database service implemented as part of a provider network.

* * * * *